(12) United States Patent
Scarcelli et al.

(10) Patent No.: US 12,199,396 B2
(45) Date of Patent: Jan. 14, 2025

(54) CONVERGING THERMAL LENSES, AND OPTICAL SYSTEMS, KITS, AND METHODS FOR FORMATION AND USE THEREOF

(71) Applicant: UNIVERSITY OF MARYLAND, COLLEGE PARK, College Park, MD (US)

(72) Inventors: Giuliano Scarcelli, Washington, DC (US); Eitan Edrei, Jerusalem (IL)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 847 days.

(21) Appl. No.: 17/238,863

(22) Filed: Apr. 23, 2021

(65) Prior Publication Data

US 2021/0336406 A1   Oct. 28, 2021

Related U.S. Application Data

(60) Provisional application No. 63/014,150, filed on Apr. 23, 2020.

(51) Int. Cl.
*H01S 3/08* (2023.01)
*G02F 1/01* (2006.01)

(52) U.S. Cl.
CPC ........ *H01S 3/08072* (2013.01); *G02F 1/0121* (2013.01); *G02F 1/0147* (2013.01)

(58) Field of Classification Search
CPC .... G02F 1/0121; G02F 1/0147; G02F 1/0151; G02F 1/0154; G02F 1/132; H01S 3/0401; H01S 3/04; H01S 5/024; H01S 3/08072
See application file for complete search history.

(56) References Cited

U.S. PATENT DOCUMENTS

| | | |
|---|---|---|
| 9,804,424 B2 | 10/2017 | Donner et al. |
| 10,274,648 B2 | 4/2019 | Donner et al. |

(Continued)

FOREIGN PATENT DOCUMENTS

JP          2004109892 A   *   4/2004   ............. G02F 1/293

OTHER PUBLICATIONS

Granciani et al., "Super-resolution provided by the arbitrarily strong superlinearity of the blackbody radiation," *Nature Communications*, 2019, 10:5761. (7 pages).

(Continued)

*Primary Examiner* — Christopher Stanford
*Assistant Examiner* — Journey F Sumlar
(74) *Attorney, Agent, or Firm* — RowanTree Law Group, PLLC; Frederick F. Rosenberger

(57) ABSTRACT

A converging thermal lens is transiently formed by directing a shaped pulsed light beam having at least a first wavelength to a thermo-optic material, whereby the thermo-optic material absorbs the light beam and experiences local heating in response thereto. The heating induces a refractive index profile in the thermo-optic material that temporarily forms the converging thermal lens. In some embodiments, the refractive index of the thermo-optic material has a negative temperature dependence, and the pulsed light beam is shaped to have an inverted light pattern with a maximum intensity in an outer region of the beam cross-section. Alternatively, in some embodiments, the refractive index of the thermo-optic material has a positive temperature dependence, and the pulsed light beam is shaped to have a radially-varying light pattern with a maximum intensity in a central region of the beam cross-section.

21 Claims, 6 Drawing Sheets

(56) References Cited

U.S. PATENT DOCUMENTS

2011/0202114 A1* 8/2011 Kessel .................. G01N 21/49
607/88
2016/0266466 A1 9/2016 Milchberg et al.

OTHER PUBLICATIONS

Moreau et al., "Confocal thermal-lens microscope," *Optics Letters*, Jul. 2004, 29(13): pp. 1488-1490. (4 pages).
Betzig et al., "Imaging Intracellular Fluorescent Proteins at Nanometer Resolution," *Science*, Sep. 2006, 313: pp. 1642-1645. (4 pages).
Chamanzar et al., "Ultrasonic sculpting of virtual optical waveguides in tissue," *Nature Communications*, 2019, 10(1):92. (10 pages).
Darafsheh et al., "Optical super-resolution by high-index liquid-immersed microspheres," *Applied Physics Letters*, Oct. 2012, 101:141128. (4 pages).
Donner et al., "Fast and transparent adaptive lens based on plasmonic heating," *ACS Photonics*, Jan. 2015, 2(3): pp. 355-360. (6 pages).
Fang et al., "Sub-Diffraction-Limited Optical Imaging with a Silver Superlens," *Science*, Apr. 2005, 308: pp. 534-537. (4 pages).
Gordon et al., "Long-Transient Effects in Lasers with Inserted Liquid Samples," *Journal of Applied Physics*, Jan. 1965, 36(1): pp. 3-8. (6 pages).
Hell et al., "Breaking the diffraction resolution limit by stimulated emission: stimulated-emission-depletion fluorescence microscopy," *Optics Letters*, Jun. 1994, 19(11): pp. 780-782. (3 pages).
Helseth, L.E., "Breaking the diffraction limit in nonlinear materials," *Optics Communications*, 2005, 256: pp. 435-438. (4 pages).
Hess et al., "Ultra-High Resolution Imaging by Fluorescence Photoactivation Localization Microscopy," *Biophysical Journal*, Dec. 2006, 91: pp. 4258-4272. (15 pages).
Huang et al., "Breaking the Diffraction Barrier: Super-Resolution Imaging of Cells," *Cell*, Dec. 2010, 143: pp. 1047-1058. (12 pages).
Jang et al., "Wavefront shaping with disorder-engineered metasurfaces," *Nature Photonics*, Feb. 2018, 12: pp. 84-90. (8 pages).
Jhajj et al., "Demonstration of Long-Lived High-Power Optical Waveguides in Air," *Physical Review X*, Feb. 2014, 4(1):011027. (8 pages).
Li et al., "Single-cell biomagnifier for optical nanoscopes and nanotweezers," *Light: Science & Applications*, 2019, 8(1):61. (12 pages).
Long et al., "Thermal Lens Technique: A New Method of Absorption Spectroscopy," *Science*, Jan. 1976, 191(4223): pp. 183-185. (4 pages).
Pendry, J.B., "Negative Refraction Makes a Perfect Lens," *Physical Review Letters*, Oct. 2000, 85(18): pp. 3966-3969. (4 pages).
Scopelliti et al., "Ultrasonically sculpted virtual relay lens for in situ microimaging," *Light: Science & Applications*, 2019, 8:65. (15 pages).
Uchiyama et al., "Thermal Lens Microscope," *Japanese Journal of Applied Physics*, 2000, 39(9R): pp. 5316-5322. (7 pages).
Vellekoop et al., "Exploiting disorder for perfect focusing," *Nature Photonics*, May 2010, 4(5): pp. 320-322. (3 pages).
Veselago, V.G., "The electrodynamics of substances with simultaneously negative values of $\epsilon$ and $\mu$," *Soviet Physics USP EKHI*, Jan.-Feb. 1968, 10(4): pp. 509-514. (6 pages).
Wang et al., "Optical virtual imaging at 50 nm lateral resolution with a white-light nanoscope," *Nature Communications*, Mar. 2011, 2:218. (6 pages).
Zhang et al., "Superlenses to overcome the diffraction limit," *Nature Materials*, Jun. 2008, 7(6): pp. 435-441. (7 pages).

* cited by examiner

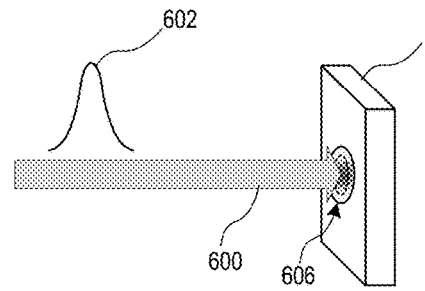
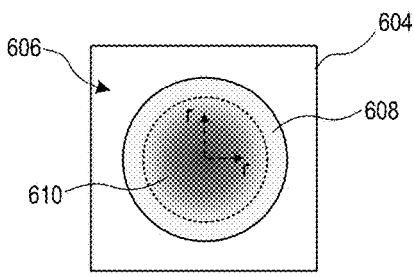
FIG. 6A    FIG. 6B
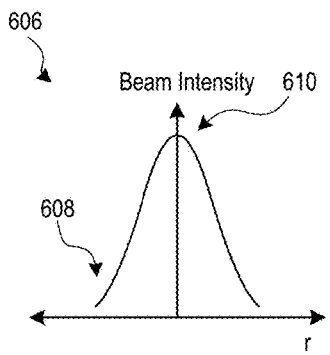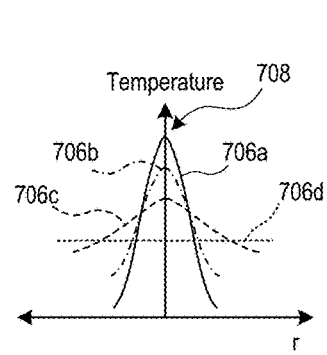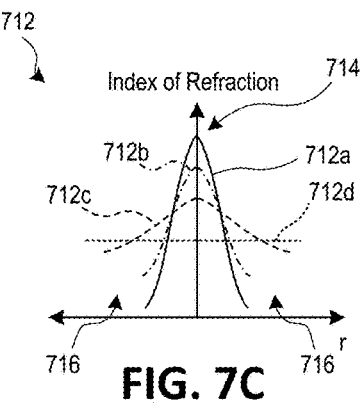
FIG. 7A    FIG. 7B    FIG. 7C
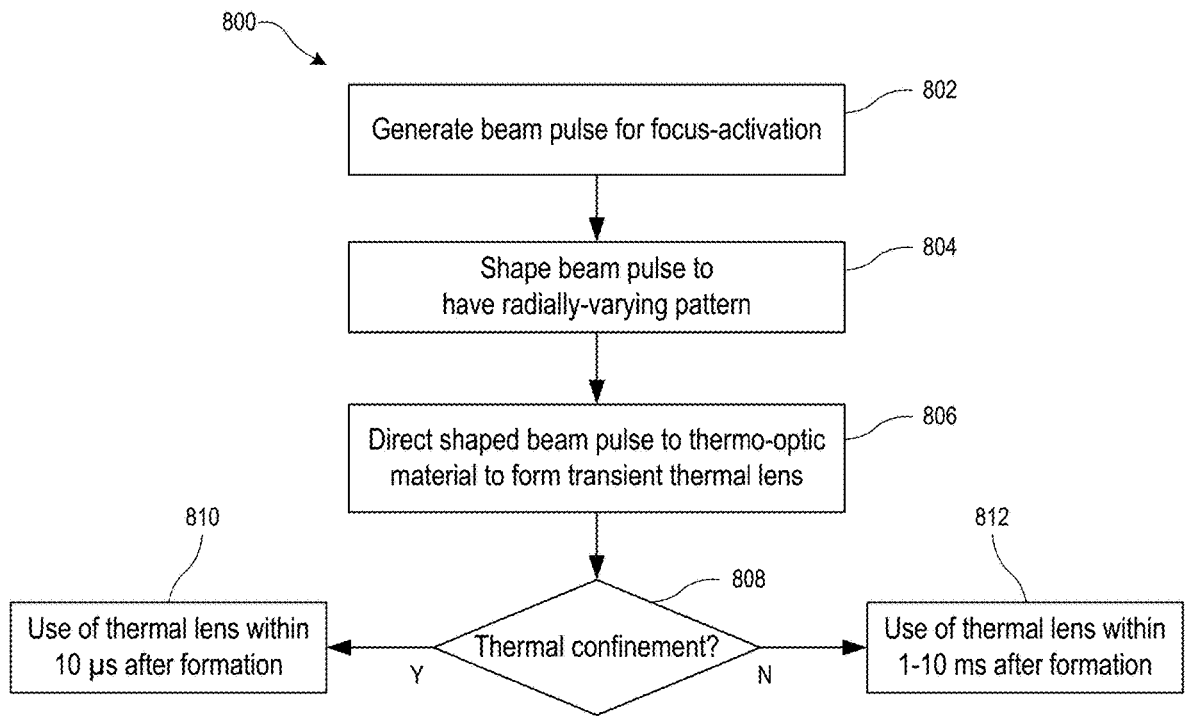
FIG. 8

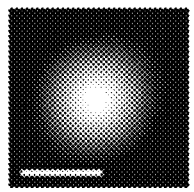
FIG. 12A
FIG. 12B
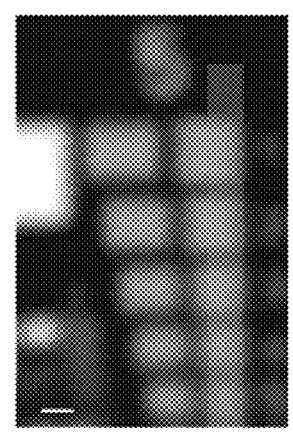
FIG. 13A
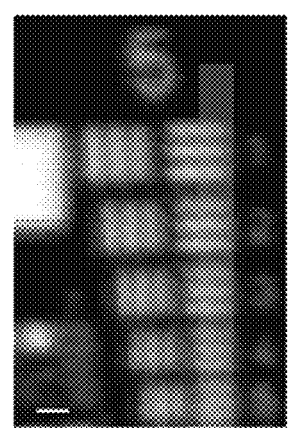
FIG. 13B
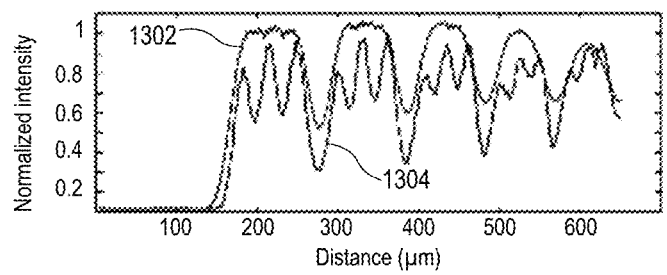
FIG. 13C
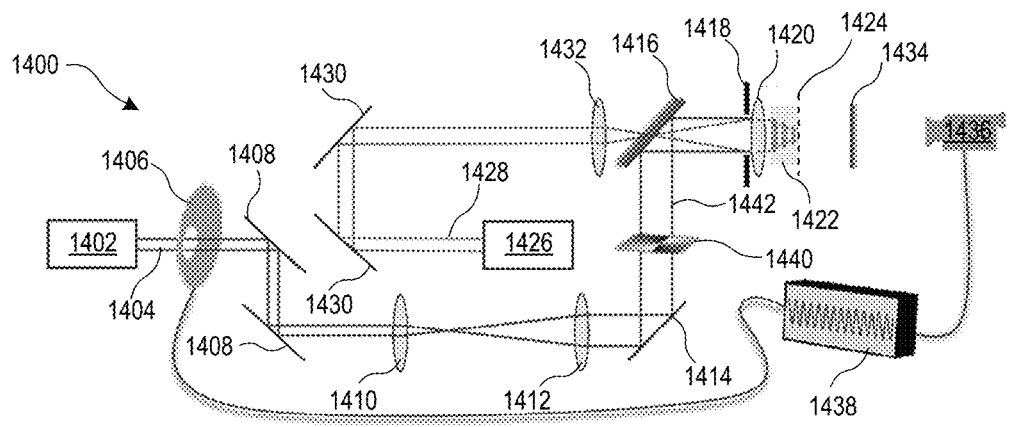
FIG. 14

CONVERGING THERMAL LENSES, AND OPTICAL SYSTEMS, KITS, AND METHODS FOR FORMATION AND USE THEREOF

CROSS-REFERENCE TO RELATED APPLICATION

The present application claims the benefit of U.S. Provisional Application No. 63/014,150, filed Apr. 23, 2020, entitled "Method and Apparatus to Increase Focusing and Resolution of Optical Microscopes," which is incorporated by reference herein in its entirety.

STATEMENT REGARDING FEDERALLY SPONSORED RESEARCH

This invention was made with government support under CMMI1929412 awarded by the National Science Foundation. The government has certain rights in the invention.

FIELD

The present disclosure relates generally to focusing of electromagnetic radiation, and more particularly, to formation and use of transient, converging thermal lenses for focusing.

BACKGROUND

In imaging applications, localization techniques and stimulated emission have been used to overcome the diffraction limit by exploiting chemical properties of fluorophores. However, in these methods, light is not physically focused beyond the diffraction limit. The discovery of metamaterials has enabled the design of super-lenses, which are capable of sub-diffraction imaging by enhancing the evanescent field that is otherwise be lost in typical configuration. In addition, microspheres placed in the vicinity of an object have been shown to provide sub-wavelength resolution by curving the incident and reflected rays. However, these modalities require precise placement of external optical elements in close proximity to sample, which can present challenges depending on the type of sample to be imaged.

SUMMARY

Embodiments of the disclosed subject matter provide focusing of light by using a thermal lens transiently formed in a thermo-optic material by absorption of a radially-varying light pattern. The absorption of the light pattern can result in localized heating that generates a semi-parabolic refractive index profile within the thermo-optic material, which refractive index profile has the effect of a converging lens. In some embodiments, the thermal lens can be directly formed within a sample being imaged. Alternatively, in some embodiments, the thermal lens is formed within a thermo-optic material placed before a sample to be imaged. In some embodiments, the transient thermal lens can be combined with an optical system (e.g., microscope) and used to achieve a physical focus that would otherwise be beyond the diffraction limit of the optical system. For example, an optical system employing the disclosed thermal lens can be used for super-resolution imaging by scanning the focused spot across the sample or thermo-optic material.

In a representative embodiment, an optical system comprises a light source, a beam-shaping optical assembly, a thermo-optic material, and a transient converging thermal lens. The light source can provide a focus-activation beam of light having at least a first wavelength. The beam-shaping optical assembly can comprise one or more optical components disposed in or along an optical path to a sample. The beam-shaping optical assembly can form the focus-activation beam from the first light source to have a radially-varying light pattern. The thermo-optic material can be disposed in the optical path before a target portion of a sample and can absorb light at the first wavelength. A temperature of the thermo-optic material can increase in response to the absorption. The transient converging thermal lens can be formed in the thermo-optic material by a heating-induced refractive index profile generated by the absorption of the focus-activation beam with the radially-varying light pattern.

In another representative embodiment, a method can comprise forming a transient converging thermal lens. The forming the thermal lens can comprise generating a first beam of light having at least a first wavelength, shaping the first beam to have a radially-varying light pattern, and directing the shaped first beam to a thermo-optic material. The thermo-optic material can absorb light at the first wavelength, and a temperature of the thermo-optic material can increase in response to said absorption. The thermal lens can be formed in the thermo-optic material by a heating-induced refractive index profile generated by the absorption of the shaped first beam with the radially-varying light pattern.

In some embodiments, a temperature dependence of refractive index of the thermo-optic material can be negative, and the radially-varying light pattern can be an inverted light pattern having a minimum or zero intensity within a central region and a maximum intensity within an outer region surrounding the central region. Alternatively, a temperature dependence of refractive index of the thermo-optic material can be positive, and the radially-varying light pattern can have a maximum intensity within a central region and a minimum or zero intensity within an outer region surrounding the central region.

In another representative embodiment, a kit for improving resolution of an optical microscope can comprise a focus-activation light source, a beam-shaping optical assembly, and a thermal lensing member. The optical microscope can have an objective lens and a probe beam light source. The focus-activation light source can be constructed to provide a beam of light having at least a first wavelength that is different from a wavelength emitted by the probe beam light source. The beam-shaping optical assembly can comprise one or more optical components to be disposed in or along an optical path to a sample. The beam-shaping optical assembly can be constructed to form the beam from the focus-activation light source to have a radially-varying light pattern. The thermal lensing member can be constructed to be disposed in the optical path before the sample. The thermal lensing member can also be being constructed to absorb light at the first wavelength such that a temperature of the thermal lensing member increases in response to said absorption. The thermal lensing member can absorb light at the first wavelength different than light at the wavelength emitted by the probe beam light source.

In some embodiments, a temperature dependence of refractive index of the thermal lensing member can be negative, and the radially-varying light pattern can be an inverted light pattern having a minimum or zero intensity within a central region and a maximum intensity within an outer region surrounding the central region. Alternatively, the temperature dependence of refractive index of the thermal lensing member can be positive, and the radially-varying light pattern can have a maximum intensity within a central region and a minimum or zero intensity within an outer region surrounding the central region.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. For example, in some figures, the propagation of light has not been shown or has been illustrated using block arrows or solid/dashed lines rather than employing ray diagrams. Throughout the figures, like reference numerals denote like elements.

FIG. 6A illustrates a configuration where a light pulse shaped to have a radially-varying light pattern is incident on a thermo-optic material, according to one or more embodiments of the disclosed subject matter.

FIG. 6B is a plan view of the radially-varying light pattern incident on the thermo-optic material in FIG. 6A, according to one or more embodiments of the disclosed subject matter.

FIG. 7A illustrates an intensity profile of the shaped light pulse incident on the thermo-optic material in the configuration of FIGS. 6A-6B, according to one or more embodiments of the disclosed subject matter.

FIG. 7B illustrates evolution over time of a temperature profile induced in the thermo-optic material due to heating from absorption of the shaped light pulse in the configuration of FIGS. 6A-6B, according to one or more embodiments of the disclosed subject matter.

FIG. 7C illustrates evolution over time of a refractive index profile generated by the time-varying temperature profiles of FIG. 7B, according to one or more embodiments of the disclosed subject matter.

FIG. 8 is a generalized process flow diagram for an exemplary method of forming a transient converging thermal lens, according to one or more embodiments of the disclosed subject matter.

FIGS. 12A-12B are images of a diffraction-limited spot obtained using a microscope setup, prior to and after installation of a thermal-lens-forming optical assembly, respectively, according to one or more embodiments of the disclosed subject matter. The scale bar in FIG. 12A represents 30 μm.

FIGS. 13A-13B are images of a USAF resolution chart (U.S. Air Force MIL-STD-150A, 1951) obtained using a microscope setup, prior to and after installation of a thermal-lens-forming optical assembly, respectively, according to one or more embodiments of the disclosed subject matter.

FIG. 13C is a line plot of normalized intensity in the respective marked regions of FIGS. 13A-13B.

FIG. 14 is simplified schematic diagram of an experimental setup having a thermal-lens-forming optical assembly, according to one or more embodiments of the disclosed subject matter.

DETAILED DESCRIPTION

General Considerations

Figure 1:
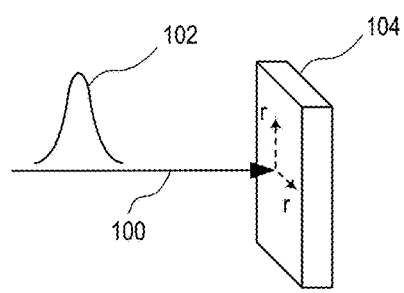
FIG. 1 illustrates a configuration where a light pulse is incident on a thermo-optic material.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and subcombinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods, as known to those of ordinary skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein, but are not intended to be limiting. For example, certain terms may be used such as "inner," "outer,", "upper," "lower," "top," "bottom," "interior," "exterior," "left," "right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Features of the presently disclosed subject matter will be apparent from the following detailed description and the appended claims.

Overview of Terms

The following explanations of specific terms and abbreviations are provided to facilitate the description of various aspects of the disclosed subject matter and to guide those of ordinary skill in the art in the practice of the disclosed subject matter.

Light or optical: Referring to the visible light portion of the electromagnetic spectrum as well as wavelengths bordering the visible light portion that are typically used for imaging, e.g., having wavelengths within a range of 300 nm to 15 μm.

Radially-varying pattern: A light pattern that varies across a width of the light beam, either in a continuous or discontinuous manner. In some embodiments, the radially-varying pattern may be substantially annular with a peak-intensity in an outer ring and a minimum or zero intensity in a central region.

Inverted light pattern: A light pattern that has a profile (e.g., location of peaks and troughs) that is opposite to a desired profile for the refractive index to be generated in the thermo-optic material.

Thermo-optic material: A material that changes refractive index in response to temperature. The relationship between temperature of the thermo-optic material may be positive (e.g., increased temperature generates an increase in refractive index) or negative (e.g., increased temperature generates a decrease in refractive index). While most materials are considered thermo-optic to some extent, embodiments of the disclosed subject matter align the light absorption characteristics of the material (e.g., light wavelength where absorption may be especially high) with an incident light pattern to achieve localized heating that forms a refractive index profile for focusing.

Introduction

In embodiments of the disclosed subject matter, a converging thermal lens can be transiently formed by directing a light pulse to a material. The light pulse is shaped to have a radially-varying intensity pattern. Absorption of the light pulse by the material generates localized heating therein, corresponding to the pattern of the incident light. Due to the material's thermo-optic coefficient, the radially-varying temperature profile resulting from the localized heating induces a radially-varying refractive index profile in the material that can act like a focusing lens, e.g., a converging thermal lens. Thermal diffusion within the material over time flattens the temperature profile, and thereby the refractive index profile, such that the focusing effect of the thermal lens is only available for a short period (e.g., on the order of milliseconds or less). The converging thermal lens is thus transient, although subsequent light pulses to the material can periodically reform the thermal lens.

In some embodiments, the transient converging thermal lens can be used in combination with an existing optical system, such as a microscope. The combination can be capable of focusing light to a spot size that is otherwise below the diffraction limit of the existing optical system. In some embodiments, one or more components for forming the transient thermal lens can be offered as a kit for modification of the existing optical system. The availability of sub-diffraction spot size offered by the disclosed thermal lens technique can be used to advantage in numerous applications, such as delivery of light to photoactive nanostructures, super-resolution imaging of a sample without requiring labels, and spectroscopic measurements at higher resolutions, as well as other applications.

Thermal Lens Formation

Figures 2A, 2B, 2C:
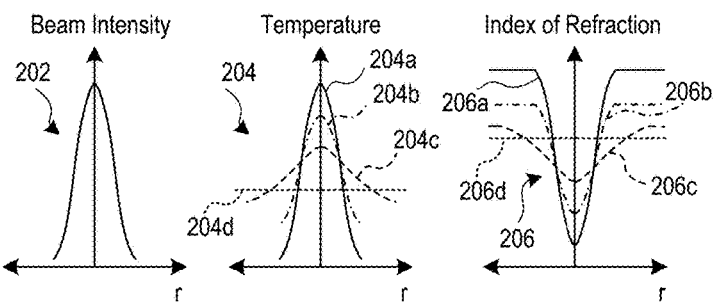
FIG. 2A illustrates an intensity profile of the light pulse incident on the thermo-optic material in the configuration of FIG. 1.
FIG. 2B illustrates evolution over time of a temperature profile induced in the thermo-optic material due to heating from absorption of the light pulse in the configuration of FIG. 1.
FIG. 2C illustrates evolution over time of a refractive index profile generated by the time-varying temperature profiles of FIG. 2B.

Referring initially to FIGS. 1-2C, interaction of light with a material will initially be described. In particular, the material 104 is illuminated with a pulsed beam 100 of light, as shown in FIG. 1. Pulse 102 of beam 100 may have a narrow intensity profile with respect to a width of the beam 100, e.g., with respect to radial direction, r. As shown in FIG. 2A, the intensity profile 202 can have a peak at a center of the beam 100 that decreases radially outward, for example, to form a substantially Gaussian curve. The pulse 102 can be at a wavelength that is absorbed by the material 104, such that the pulse absorption causes localized heating in the material, which in turn generates a corresponding localized temperature rise in a pattern corresponding to the beam intensity profile 202. For example, heating due to absorption of pulse 102 by material 104 can yield a maximum temperature increase at a location coinciding with the peak of beam intensity profile 202. However, thermal diffusion of the heating from the localized regions to the surrounding material will cause the temperature to evolve toward equilibrium over time. Thus, the profiles 204 of temperature within the material 104 will progress from an initial profile 204a, which may have a shape corresponding to the intensity profile 202 (e.g., substantially Gaussian) of the absorbed pulse, to a final profile 204d, which may be substantially flat.

Due to the thermo-optic coefficient of the material 104, the index of refraction of the material 104 will change in response to the temperature change. For many materials, the thermo-optic coefficient is negative, such that an increase in temperature leads to a decrease in refractive index, and vice versa. Accordingly, the initial temperature profile 204a generated in material 104 by the absorption of pulse 102 yields an initial refractive index profile 206a. The profiles 206 of the refractive index will continue to evolve over time in correspondence with the evolution of the temperature profiles, for example, from initial profile 206a to a final profile 206d, which may be substantially flat. While the absorption of pulse 102 by material 104 may lead to formation of a transient refractive index profile, refractive index profiles 206a-206c have a local minimum value at its center surrounded by higher refractive index values. Refractive index profiles 206a-206c thus have the effect of defocusing or acting as a negative or diverging lens with respect to incident unabsorbed light, but are incapable of providing focusing.

Figure 3A:
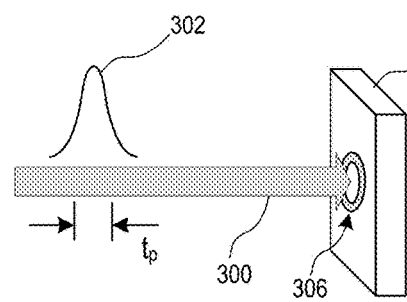
FIG. 3A illustrates a configuration where a light pulse shaped to have an inverted light pattern is incident on a thermo-optic material, according to one or more embodiments of the disclosed subject matter.
Figure 3B:
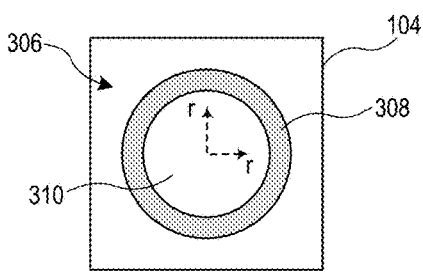
FIG. 3B is a plan view of the inverted light pattern incident on the thermo-optic material in FIG. 3A, according to one or more embodiments of the disclosed subject matter.

Accordingly, to provide focusing (or acting as a converging lens) in some embodiments of the disclosed subject matter, the incident beam (also referred to herein as a focus activation beam) is shaped to have an inverted pattern with respect to a refractive index profile that provides focusing. For example, in FIGS. 3A-3B, material 104 is illuminated with a pulsed beam 300 of light that has been shaped to have inverted light pattern 306. For example, the inverted light pattern 306 can be a ring with an annular region 308 have peak intensity (or at least a higher intensity than central region 310 and the radially-outer region immediately surrounding region 308) and a central region 310 surrounded by the annular region having a minimum or zero intensity (or at least a lower intensity than annular region 308).

The shaping of the beam 300 to have the inverted light pattern can be performed by a beam shaping optical assembly, which can include any type of diffractive optical element, refractive optical element, and/or adaptive optics (AO), such as a spatial light modulator (SLM). Exemplary SLMs include, but are not limited to, deformable mirrors (DM), digital micromirror devices (DMDs), or a liquid crystal device, such as liquid crystal on silicon (LCoS) modulators. In some embodiments, the beam shaping optical assembly includes a phase plate, for example, a vortex phase plate. Other types of electro-optic devices or phase-changing elements to provide beam intensity shaping (whether in a transmissive configuration or a reflective configuration) are also possible according to one or more contemplated embodiments.

Figures 4A, 4B, 4C:
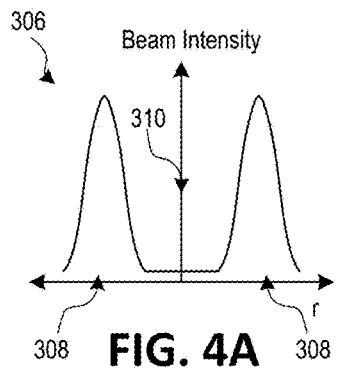
FIG. 4A illustrates an intensity profile of the shaped light pulse incident on the thermo-optic material in the configuration of FIGS. 3A-3B, according to one or more embodiments of the disclosed subject matter.
FIG. 4B illustrates evolution over time of a temperature profile induced in the thermo-optic material due to heating from absorption of the shaped light pulse in the configuration of FIGS. 3A-3B, according to one or more embodiments of the disclosed subject matter.
FIG. 4C illustrates evolution over time of a refractive index profile generated by the time-varying temperature profiles of FIG. 4B, according to one or more embodiments of the disclosed subject matter.

Absorption of the shaped light pulse 302 causes localized heating in material 104 that generates an initial temperature profile 408a, which in turn degrades over time toward uniform temperature profile 408d due to thermal diffusion, as shown in FIG. 4B. However, since the thermo-optic coefficient of the material is negative, the refractive index profiles 414a-414c now have local maxima at center 416 surrounded by lower refractive index values in region 418. Refractive index profiles 414a-414c thus have the effect of focusing with respect to incident unabsorbed light, in essence sculpting a transient converging lens with a diameter equal to the optical diffraction limit of beam 300.

The focusing provided by the transient refractive index profiles 414 is the result of a thermal nonlinear effect that can be described mathematically by considering the temperature effect on the refractive index (e.g., the thermo-optic coefficient) given by:

$$n(r, t) = n_0 + \left(\frac{dn}{dT}\right) T(r, t) \tag{1}$$

where T(r, t) is the temperature distribution in the material 104. In some embodiments for operation on the millisecond time scale (e.g., due to operational limitations in pulse intensity and/or pulse width), the temperature distribution in the material 104 can be determined from the heat diffusion equation with a given set of initial and boundary conditions dictated by the absorbed light pattern 306 and the geometrical configuration. Alternatively, in some embodiments for operation on the microsecond time scale (e.g., with high power laser sources generating pulse), the setup may operate in the thermal confinement regime, where heat diffusion can be neglected and the temperature distribution will closely follow the light beam profile. Such a setup may be available using high-power (e.g., ~1-10 mJ) laser sources that produce pulses of duration much shorter than the thermal relaxation time of material 104 (e.g., by an order of magnitude or more), for example, having a pulse width, $t_p$, less than 500 ns. Once the refractive index profile is obtained, the focusing parameters can be calculated from the geometrical ray equation.

In some embodiments, the transient thermal lens can be used in combination with an existing optical system or assembly, for example, to improve the focusing performance thereof, as described in further detail below. In such embodiments, for a time-varying parabolic profile 414a of refractive index, the focal length can be shown to follow a power-law scale $F(t) \sim t^{-1}$ and approach the value of:

$$F(\infty) = \frac{k\pi n_0 \omega_0^2}{0.24 b P l \cdot \left(\frac{dn}{dT}\right)} \quad (2)$$

where $\omega_0$ is the beam waist of the physical lens of the optical system (which may be the diffraction limited radius), b is the absorption coefficient, l is the length of the absorbing material 104, k is the thermal conductivity, and P is the laser power. Assuming the material 104 is thick enough to absorb all the light, the product of the absorption coefficient and the material length since can be eliminated since $b \sim l^{-1}$. Thus, the modulation of the refractive index can be understood as a transient microlens with radius $\omega_0$ and focal length $F(\infty)$ sculpted within the focal region of the physical lens.

With respect to lateral (x-y) coordinates (e.g., parallel to the plane containing r in FIG. 3A), the focal spot formed by the transient lens can be moved to different locations via scanning, using, for example, a scanning head or scanning principles similar to those currently employed in conventional microscopes. Alternatively or additionally, in some embodiments, the focal spot formed by the transient lens can be moved laterally by modulating the beam intensity profile 306, and thereby the refractive index profile 414 of material 104 with the desired spatial distribution. For example, such modulation can be performed by the same optical elements responsible for beam shaping (e.g., SLM) or by separate optical elements. Such a configuration may allow simultaneous or sequential measurement of multiple points by the optical system without requiring lateral scanning, which can lead to faster multiplexed operation of the optical system as well as potentially wide-field operation.

Figure 5:
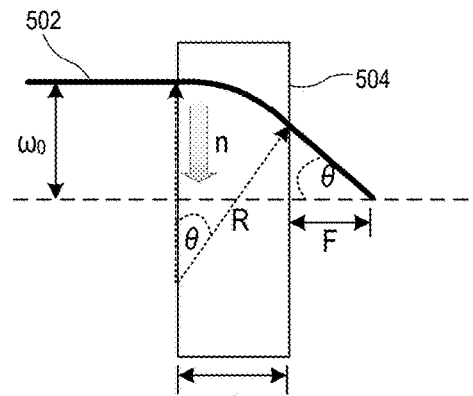
FIG. 5 is a simplified schematic diagram illustrating geometric aspects for custom forming a converging thermal lens using a shaped light pulse, according to one or more embodiments of the disclosed subject matter.

With respect to axial or depth (z) scanning, the focal depth of the transient thermal lens can be adjusting the refractive index difference between the peak region 416 and the trough region 418, for example, by adjusting the light intensity difference between the annular region 308 and the central region 308 of the inverted light pattern 306. The principle behind axial location tuning is described with respect to the partial schematic 500 of FIG. 5, where a collimated beam 502 of radius $\omega_0$ is transmitted through thermo-optic material 504 of thickness, l, that has a radially-decreasing refractive index centered at the optical axis. Let F represent the distance from material 504 to the point at which the focal point is obtained. Beam 502 propagating through the varying refractive index profile of material 504 will follow a trajectory given by:

$$\frac{1}{R} = \frac{1}{n}\left(\frac{dn}{dr}\right) \quad (3)$$

where r is the radial coordinate with respect to the optical axis. Assuming a parabolic refractive index variation of the form:

$$n = n_0\left[1 + \delta\left(\frac{r}{\omega_0}\right)^2\right] \quad (4)$$

and combining Eqns. 3 and 4, the radius of curvature can be obtained as:

$$R \approx \frac{\omega_0^2}{2\delta r} \quad (5)$$

If it is assumed that l<<F, then, from geometrical considerations, the expression for the focal distance can be approximated as:

$$F \sim \frac{r}{\theta} \sim \frac{rR}{l} \quad (6)$$

Combining Eqns. 5 and 6 yields:

$$F \approx \frac{\omega_0^2}{l \cdot 2\delta} \quad (7)$$

To estimate the value of $\delta$, the heat profile can be obtained by:

$$n(r, t) = n_0 + \left(\frac{dn}{dT}\right)\Delta T(r, t) \quad (8)$$

and solving the heat diffusion equation for a singular heat source yields:

$$\Delta T(r, t) \approx \frac{0.06 b \cdot P}{\pi k} \cdot \left[\ln\left(1 + \frac{8Dt}{\omega_0^2}\right) - \frac{16Dt}{\omega_0^2 + 8Dt} \cdot \frac{r^2}{\omega_0^2}\right] \quad (9)$$

where D is the heat diffusion coefficient. By substituting the r dependent term of Eqn. 9 into Eqn. 8, and comparing the result to the expression of Eqn. 6, the value of $\delta$ can be extracted as:

$$\delta = \left(\frac{dn}{dt}\right)\frac{0.06 b \cdot P}{\pi k n_0} \cdot \frac{16Dt}{\omega_0^2 + 8Dt} \quad (10)$$

By further combining Eqns. 7 and 10, a time-dependent expression for the focal length can be given as:

$$F(t) = \frac{\pi n_0 k \omega_0^2 (\omega_0^2 + 8Dt)}{0.24bPl(dn/dT) \cdot 8Dt} \quad (11)$$

Defining a constant time scale as $$t_c = \frac{\omega_0^2}{4D}$$

and the focal length at steady-state as $$F_\infty = \frac{k\pi n_0 \omega_0^2}{0.24bPl(dn/dT)},$$

the expression in Eqn. 11 can be rearranged as:

$$F(t) = F_\infty \cdot \left[1 + \frac{t_c}{2t}\right] \quad (12)$$

where the $t^{-1}$ behavior is clearly evident. It should be noted that the above derivation applies to scenarios in which heat diffusion is significant. However, as also noted above, the use of high-power lasers to deliver pulses of sufficiently small duration (e.g., ≤500 ns) can enable operation within the thermal confinement regime, in which case thermal diffusion can be ignored and the temperature distribution will closely follow the light beam profile.

Moreover, the discussion above with respect to FIGS. 3A-4C applies to materials that have a temperature dependence of refractive index $$\left(\text{e.g., } \frac{dn}{dT} < 0\right)$$

that is negative. For materials having a thermo-optic coefficient that is positive, an increase in temperature leads to an increase in refractive index, and vice versa. For such materials, the beam profile is altered to have a radially-varying profile that matches (rather than being inverted) the desired refractive index profile. For example, in FIGS. 6A-6B, material 604 is illuminated with a pulsed beam 600 of light that has been shaped to have radially-varying light pattern 606. For example, the radially-varying light pattern 606 can be substantially Gaussian, with a central region 610 having peak intensity (or at least a higher intensity than radially outer region 608) and annular region 610 surrounding the central region having a minimum or zero intensity (or at least a lower intensity than central region 610). As with the setup of FIGS. 3A-4C, the shaping can be performed by a beam shaping optical assembly, which can include any type of diffractive optical element, refractive optical element, and/or AO.

Absorption of the shaped light pulse 602 causes localized heating in material 604 that generates an initial temperature profile 706a, which in turn degrades over time toward uniform temperature profile 706d due to thermal diffusion, as shown in FIG. 7B. Since the thermo-optic coefficient of the material is positive, the refractive index profiles 712a-712d have a similar shape as the temperature profiles 706a-706d, with local maxima at center 714 surrounded by lower refractive index values in region 716. Refractive index profiles 712a-712c thus have the effect of focusing with respect to incident unabsorbed light.

Methods for Formation and Use of Thermal Lenses

FIG. 8 illustrates an exemplary method 800 for forming a transient converging thermal lens and use thereof. The method 800 can begin at process block 802, where light from a light source is directed to a material to transiently form the thermal lens therein based on thermo-optic effect. The light from the light source can have a wavelength that is readily absorbed by the material to cause heating thereof. In some embodiments, the wavelength of light is selected to be a wavelength preferentially absorbed by the material (e.g., a wavelength having the highest absorption as compared to other wavelengths of light). Alternatively, in some embodiments the wavelength of light is selected to be one where absorption by the material is substantial (e.g., greater than a minimum absorption for other wavelengths of light).

In some embodiments, the light from the light source is substantially monochromatic, for example, emitted from a laser or laser diode, or filtered from a polychromatic source. Alternatively, in some embodiments, the light from the light source is polychromatic and includes one or more wavelengths readily absorbed by the material. In process block 802, the light from the light source may be in the form of a single pulse or a train of light pulses. Alternatively, in some embodiments, the light source may be configured to continuously emit light, and periodic illumination to allow thermal reset of the material can achieved by on-off control of the light source or actuation of a separate optical element in the beam path (e.g., a shutter).

The method 800 can proceed to process block 804, where the light form the light source is shaped to have a radially-varying pattern prior to reaching the thermo-optic material. When the thermo-optic material has a temperature dependence of refractive index that is negative (as is the case with many materials), the radially-varying pattern can be an inverted pattern (e.g., having a minimum or void in a central region and a maximum in an annular region surrounding the central region). Alternatively, when the thermo-optic material has a temperature dependence of refractive index that is positive, the radially-varying pattern can have a maximum in the central region and a minimum or void in the annular region surrounding the central region. As noted above, the shaping of the beam can be accomplished using a beam-shaping optical assembly, which can include any type of diffractive element, refractive element, or AO, alone or in combination. In particular fabricated example, the beam shaping is performed by a vortex phase plate.

In some embodiments, the shaping of process block 804 can further include forming multiple patterns simultaneous in a one-dimensional (e.g., linear) or two-dimensions array, for example, to allow a corresponding array of thermal lenses to be simultaneously generated within the thermo-optic material (e.g., to allow multiplexed imaging). Alternatively or additionally, the shaping of process block 804 can include altering of beam propagation (e.g., beam steering) to be incident on a different part of the thermo-optic material, for example, to achieve scanning with respect to a sample.

In some embodiments, the generating of process block 802 and/or the shaping of process block 804 can further include altering an intensity of the light from the light source, for example, to change a focal length of the resulting thermal lens. For example, by increasing the peak intensity of the light beam, the difference between peak and trough of the thermal profile resulting from absorption of the light by the material can be increased. This, in turn, can increase the difference in refractive indices between the central and outer regions, thereby yield shorter focal lengths. Longer focal lengths can be obtained by decreasing the peak intensity of the light beam.

The method 800 can proceed to process block 806, where the shaped light beam is directed onto the thermo-optic material to transiently form the converging thermal lens therein. In some embodiments, the light can be directly incident on the thermo-optic material (e.g., from beam-shaping optical assembly without an intervening functional optical assembly (as used here functional optical assembly excludes non-functional optical components, such as reflectors or dichroic mirrors that are designed to merely alter a beam path)). Alternatively, in some embodiments, the light can be incident on the thermo-optic material after passing through a functional optical assembly (e.g., through a focusing lens or microscope objective). In some embodiments, the directing of process block 806 can include altering the beam propagation to be incident on a different part of the thermo-optic material, for example, to achieve scanning with respect to a sample. For example, in some embodiments, the altering of the beam propagation can be performed using one or more pivoting mirrors within the optical beam path between the beam shaping device and the thermo-optic material.

The method 800 can proceed to decision block 808, where it is determined if operation in the thermal confinement regime is possible. As noted above, thermal confinement refers to when heat diffusion can be neglected, such that the temperature distribution will closely follow the light beam profile, and thereby avoiding detailed calculations to determine refractive index profile based on diffusion. Generally, thermal confinement can occur when the pulse of light incident on the thermo-optic material has a pulse width much less than the thermal relaxation time of the material, which relaxation time can vary based on material composition, thermal conductivity, and other factors. For example, the pulse width for the light may be less than 500 ns in order to operate in the thermal confinement regime. However, with such short pulse lengths, high power can be used to obtain the necessary heating to generate the refractive index difference for focusing. Accordingly, thermal confinement may also require the use of high-power light sources (e.g., ≥1 mJ).

If the light source provides light of sufficiently high power and sufficiently short duration, the method 800 can proceed to process block 810, where the thermal lens is used in the thermal confinement regime. In this configuration, the refractive index profile generated within the thermo-optic material closely follows the inversion of the beam intensity profile, which refractive index profile may persist for up to several microseconds, for example, 10 µs or less. Absorption of the light by the material initially generates an acoustic wave that causes fluctuation in the thermal profile, and thus the refractive index profile. Accordingly, use of the thermal lens can be delayed until after the acoustic effects subside, for example, at least 10 ns after the light pulse. Operation in the thermal confinement regime thus defines a first time window of between 10 ns and 10 µs after absorption where the refractive index profile in the thermo-optic material can be used as a converging thermal lens.

Alternatively, if the light source does not provide light of sufficiently high power or sufficiently short duration (or if operation at millisecond time scales is preferred, or for any other reason), the method 800 can proceed from decision block 808 to process block 812, where the thermal lens is used in the thermal diffusion regime. In this configuration, the refractive index profile depends on the thermal diffusion in addition to the beam intensity profile, which refractive index profile may take on the order of milliseconds to evolve, for example, at least 1 ms. Thus, operation in the thermal diffusion regime defines a second time window of, for example, 1-10 ms after absorption where the refractive index profile in the thermo-optic material can be used as a converging thermal lens. Calculations or simulations may be used to determine the exact use timing and light characteristics (e.g., pulse width, intensity, profile shape) for a refractive index profile for the thermal lens, for example, taking into account the time evolution of the profile based on thermal diffusion.

In either process block 810 or process block 812, the generated thermal lens can be used to provide focusing for imaging, illumination, detection, etc. For example, in some embodiments, the thermal lens can be used to enhance the focusing and/or resolution of an optical microscope (e.g., transmission, inverted, confocal, fluorescence, etc.) beyond its diffraction limit (e.g., super-resolution imaging). Alternatively, the thermal lens can be employed in any other optical application where a converging lens would be useful.

Although some of blocks 802-812 of method 800 have been described as being performed once, in some embodiments, multiple repetitions of a particular process block may be employed before proceeding to the next decision block or process block. In addition, although blocks 802-812 of method 800 have been separately illustrated and described, in some embodiments, process blocks may be combined and performed together (simultaneously or sequentially). Moreover, although FIG. 8 illustrates a particular order for blocks 802-812, embodiments of the disclosed subject matter are not limited thereto. Indeed, in certain embodiments, the blocks may occur in a different order than illustrated or simultaneously with other blocks.

Figure 9:
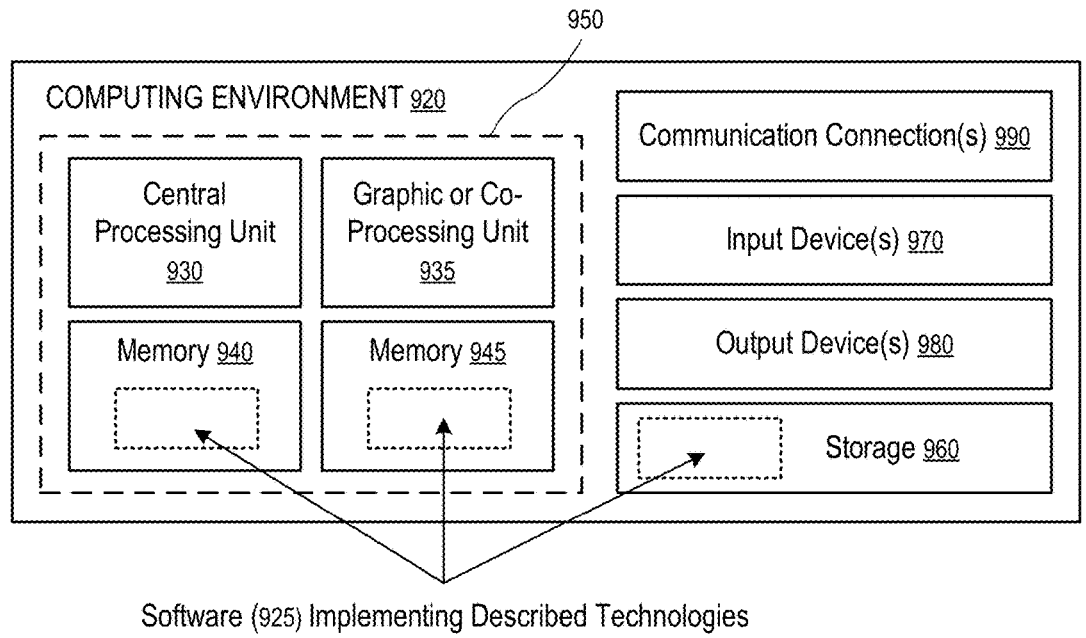
FIG. 9 depicts a generalized example of a computing environment in which the disclosed technologies may be implemented.

FIG. 9 depicts a generalized example of a suitable computing environment 920 in which the described innovations may be implemented, such as aspects of method 800, controller 1146, or function generator 1438. The computing environment 920 is not intended to suggest any limitation as to scope of use or functionality, as the innovations may be implemented in diverse general-purpose or special-purpose computing systems. For example, the computing environment 920 can be any of a variety of computing devices (e.g., desktop computer, laptop computer, server computer, tablet computer, etc.). In some embodiments, the computing environment is an integral part of an optical imaging system. Alternatively, in some embodiments, the computing environment is a separate system connected to the optical imaging system, for example, by making operative electrical connections (e.g., wired or wireless) to the optical imaging system or components thereof.

With reference to FIG. 9, the computing environment 920 includes one or more processing units 930, 935 and memory 940, 945. In FIG. 9, this basic configuration 950 is included within a dashed line. The processing units 930, 935 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 930 as well as a graphics processing unit or co-processing unit 935. The tangible memory 940, 945 may be volatile memory (e.g., registers, cache, RAM), non-volatile memory (e.g., ROM, EEPROM, flash memory, etc.), or some combination of the two, accessible by the processing unit(s). The memory 940, 945 stores software 925 implementing one or more innovations described herein, in the form of computer-executable instructions suitable for execution by the processing unit(s).

A computing system may have additional features. For example, the computing environment 920 includes storage 960, one or more input devices 970, one or more output devices 980, and one or more communication connections 990. An interconnection mechanism (not shown) such as a bus, controller, or network interconnects the components of the computing environment 920. Typically, operating system software (not shown) provides an operating environment for other software executing in the computing environment 920, and coordinates activities of the components of the computing environment 920.

The tangible storage 960 may be removable or non-removable, and includes magnetic disks, magnetic tapes or cassettes, CD-ROMs, DVDs, or any other medium which can be used to store information in a non-transitory way, and which can be accessed within the computing environment 920. The storage 960 can store instructions for the software 925 implementing one or more innovations described herein.

The input device(s) 970 may be a touch input device such as a keyboard, mouse, pen, or trackball, a voice input device, a scanning device, or another device that provides input to the computing environment 920. The output device(s) 970 may be a display, printer, speaker, CD-writer, or another device that provides output from computing environment 920.

The communication connection(s) 990 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or other carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

Optical Systems Employing Transient Thermal Lenses

Figure 10A:
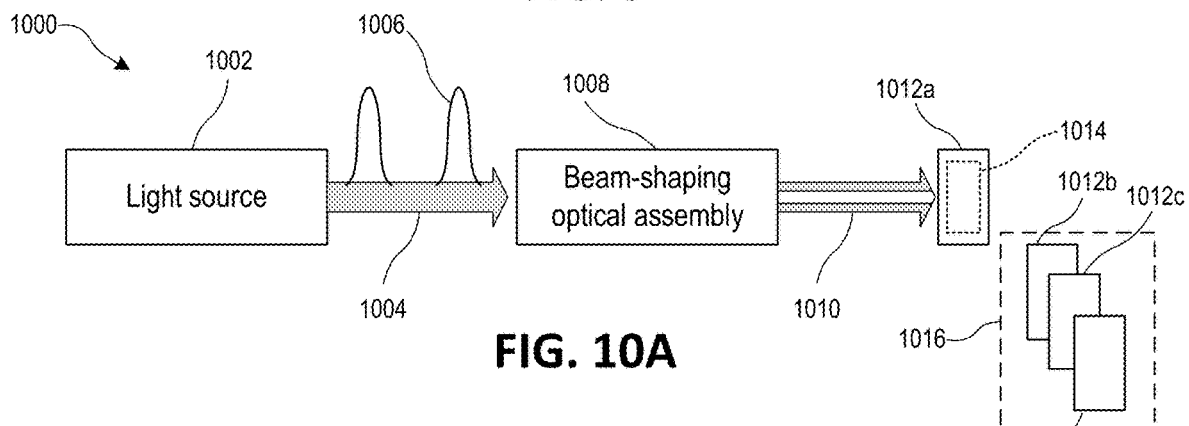
FIG. 10A is a simplified schematic diagram of a setup or assembled kit for transiently forming a converging thermal lens in a thermal lensing member, according to one or more embodiments of the disclosed subject matter.

FIG. 10A illustrates a setup 1000, which can be adapted as a kit for modification of an existing optical system, such as a microscope. Setup 1000 can include a focus-activation light source 1002 (e.g., a polychromatic source or a substantially monochromatic source, such as a laser), a beam-shaping optical assembly 1008, and a library 1016 of different thermal lensing members 1012a-1012d. In some embodiments, the focus-activation light source 1002 can emit a pulsed light beam 1004 comprised of a train of individual light pulses 1006. As with the previously described examples, light pulse 1006 is shaped by a beam-shaping optical assembly 1008 to have a radially-varying intensity profile (e.g., inverted profile or otherwise depending on the thermo-optic characteristics of the thermal lensing member), thereby forming a shaped output beam 1010 that is directed to the thermal lensing member 1012a. Absorption of a pulse 1006 by a thermal lensing member 1012a can generate heating that forms a temperature profile, which in turn induces a refractive index profile forming the transient thermal lens.

The thermal lensing member 1012a can be a thermo-optic material selected or designed to maximize, or at least enhance, thermo-optic interaction with light beam 1010 to form the transient thermal lens. For example, the thermal lensing member 1012a can be custom-engineered to strongly absorb at the wavelength(s) emitted by the light source 1002, and/or the wavelength(s) of light emitted by the light source 1002 can be chosen to be one strongly absorbed by the thermal member 1012a. In some embodiments, the absorption profile for the thermal lensing member 1012a can have a strong peak at the wavelength of the focus-activation beam 1010, such that the beam is fully absorbed within the thickness of the thermal lensing member 1012a and the thermal effect is maximized. Moreover, the thermal lensing member 1012a can be selected or designed to minimize, or at least reduce, absorption at another wavelength(s), e.g., so as to be substantially transparent for imaging or other use of the thermal lens. In some embodiments, the absorption profile for the thermal lensing member 1012a can have minimal absorption at wavelengths of probe light or detection light in the optical system in which the setup 1000 is installed, such that the optical focusing effect can be achieved with minimal insertion loss. In some embodiments, the thermal lensing member 1012a can be formed of a material or materials having a high temperature dependence of refractive index (e.g., thermo-optic coefficient) so as to minimize, or at least reduce, the energy required for focus-activation beam 1010. In some embodiments, the thermal lensing member 1012a can be formed of a material that has a low heat conductivity so as to minimize heat diffusion and thereby obtain time stable focusing patterns.

Since the wavelength at which the thermal lens is used may change depending upon the application (e.g., imaging with a probe beam only versus imaging of fluorescence excited by a probe beam), the library 1016 can include alternative thermal lensing members 1012b-1012d with different optical characteristics, such as different spectral absorption profiles and/or different non-absorption wavelengths (e.g., transparent windows). Accordingly, a user can select between the different lensing members 1012a-1012d to customize the optical system for probing/imaging of a particular sample. Thermal lensing members 1012a-1012d can comprise glass, polymer, ceramic, a container with liquid solution, or any combination thereof. For example, in some embodiments, the thermal lensing member comprises a thin planar member (e.g., parallelepiped shaped, for example, like a coverslip) formed of glass or plastic with one or more additives therein or thereon to enhance absorption of light. For example, the additives can include absorbing particles (e.g., dye), plasmonic particles, or both. In some embodiments, the distribution of additive within the thermal lensing member can be substantially homogenous throughout or at least in areas in which beam 1010 may be incident thereon.

When configured as a kit, the components of setup 1000 (or setup 1020 described below) can be provided to a user for independent installation into the beam path of an existing optical system (e.g., microscope), for example, in a manner similar to that illustrated in FIGS. 11A-11B. In some embodiments, the components of the kit can be individually provided for respective installation within the optical system, e.g., with focus activation light source 1002 separate from beam-shaping optical assembly 1008 and library 1016. Alternatively, in some embodiments, the focus activation light source 1002 and the beam-shaping optical assembly 1008 can be provided in a common housing for simultaneously installation within the optical system. Instead of configuring as a kit, in some embodiments, setup 1000 or setup 1020 can be integrated directly into the manufacture of a new optical system.

Figure 10B:
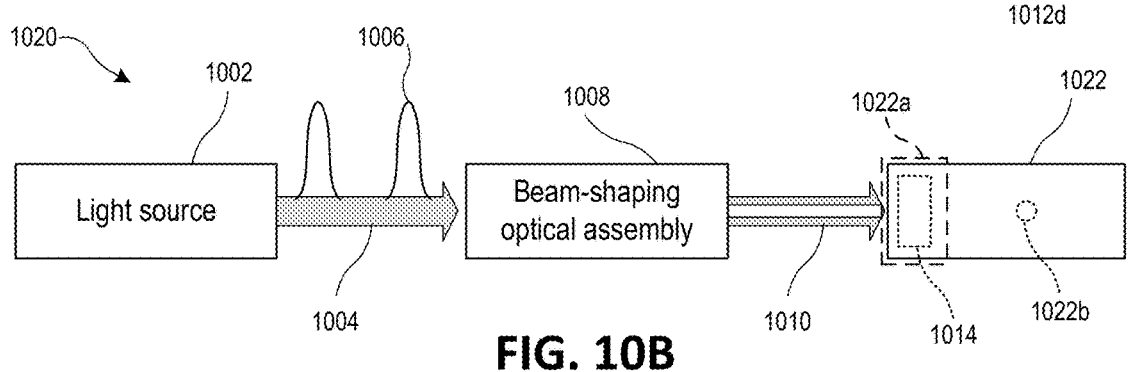
FIG. 10B is a simplified schematic diagram of another setup or assembled kit for transiently forming a converging thermal lens directly in a portion of a sample, according to one or more embodiments of the disclosed subject matter.

In some embodiments, the separate thermal lensing member can omitted. For example, FIG. 10B illustrates an alternative setup 1020 that is substantially similar to the setup 1000 of FIG. 10A, but eliminates the separate thermal lensing member 1012a in favor of forming the thermal lens in a portion 1022a of a sample 1022. The sample portion 1022a can be disposed along an optical path prior to a target portion 1022b, which corresponds to a desired location of the focal spot formed by the thermal lens. In such setup 1020, the wavelength of the light from focus-activation light source is selected for increased or maximum absorption by the sample. The configuration of setup 1020 advantageously allows focusing to be achieved without a separate component near the sample; however, it may also complicate thermal lens formation since the light absorption and/or thermo-optic properties of the sample may be less than ideal and may not otherwise be capable of engineering or customization.

Moreover, the use of thermal lensing member 1012a of setup 1000 has the added benefit of isolating the sample from heating, whereas the setup 1020 would generate heating within the sample 1022. Such heating may be problematical for samples, such as live cells or other biological samples, which are easily damaged by elevated temperatures. A common metric to assess tissue damage is the cumulative equivalent minutes at 43° ($CEM_{43}$), which for temperatures higher than 43° is given by:

$$CEM_{43} = \Delta t \cdot 0.5^{43-T} \tag{13}$$

where $\Delta t$ is the exposure time and T is the temperature reached by the sample. Damage thresholds vary between tissue types and species. In general, however, $CEM_{43}$ values between 0-20 minutes indicate minor and/or reversible effects. Setting $CEM_{43}=1$ and considering a short exposure time that can be provided by a pulsed laser from nanosecond to femtosecond yields, for example, for a pulse of duration $\Delta t=100$ fsec, a temperature of up to 86° C. (359 K) is still under the threshold for damage.

Figure 11A:
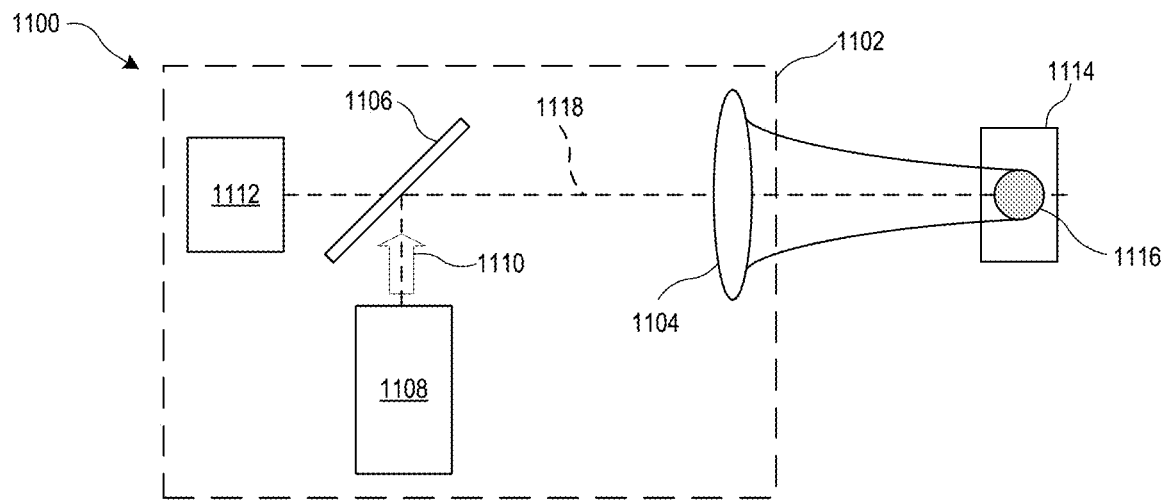
FIGS. 11A-11B are simplified schematic diagrams of a microscope setup prior to and after installation of a thermal-lens-forming optical assembly, respectively, according to one or more embodiments of the disclosed subject matter.
Figure 11B:
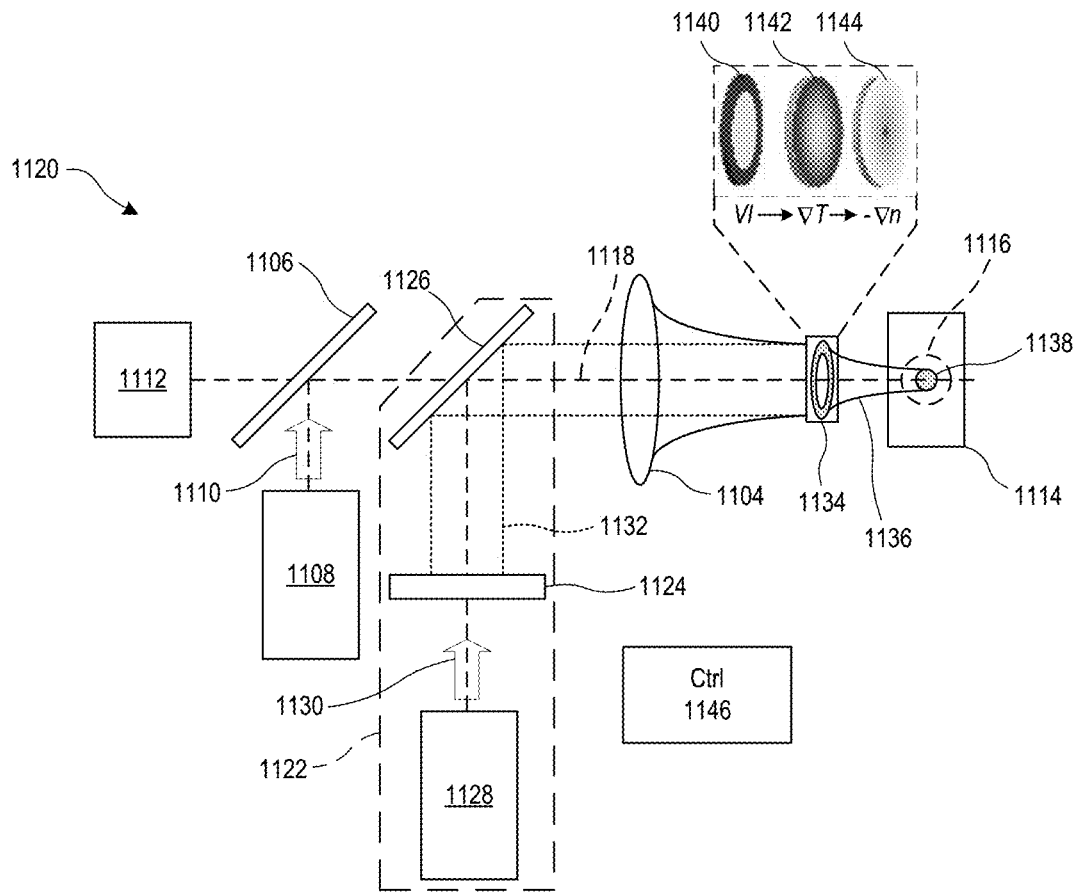

Referring to FIGS. 11A-11B, an exemplary installation of a thermal-lens-forming optical assembly into an existing microscope system 1102 is illustrated. In particular, FIG. 11A illustrates the original microscope setup 1100, and FIG. 11B illustrates the modified optical setup 1120 including thermal-lens-forming optical assembly 1122. In the original microscope setup 1100, a probe light source 1108 generates light 1110 that is directed via beam splitter or dichroic 1106 along optical path 1118 to a focusing lens or objective 1104. Objective 1104 focuses the light 1110 to a diffraction limited focal spot 1116 within sample 1114. The objective 1104 can also collect light emitted from the focal spot 1116 and direct it along optical path 1118 to an eyepiece or detector 1112 via dichroic 1106.

To achieve tighter focusing of the probe beam (or to collect light from a narrower focal spot), the microscope setup 1100 is modified to insert thermal-lens-forming optical assembly 1122 within the optical path 1118, as shown in FIG. 11B. The thermal-lens-forming optical assembly 1112 has a focus-activation light source 1128, a beam-shaping optical assembly 1124, and a second beam splitter or dichroic 1126. The focus-activation light source 1128 generates light 1130 that is shaped by a beam-shaping optical assembly 1124 to have the radially-varying light pattern, and the shaped beam 1132 is directed via beam splitter or dichroic 1126 along optical path 1118 to the objective 1104. The light 1130 emitted by the focus-activation light source 1128 can be at a wavelength (or if multiple wavelengths, have at least one wavelength) that is different from wavelength(s) in the light 1110 emitted by the probe light source 1108.

Objective 1104 also focuses the shaped beam 1132, but the beam 1132 can be absorbed by a thermal lensing member 1134, which is disposed in the optical path between the objective 1104 and the sample 1114, before it reaches the sample. The absorption of the shaped beam 1132 (e.g., having a radially-varying light pattern 1140) by thermal lensing member 1134 generates a temperature profile 1142 therein, which in turn induces a refractive index profile 1144 therein based on the thermo-optic properties of the thermal lensing member 1134. Such refractive index profile 1144 forms the transient thermal lens that can be used to modify optical performance of the microscope. For example, when the probe beam 1110 passes through the thermal lensing member 1134, it is focused to focal point 1138, which is tighter than focal point 1116 previously achievable by the unmodified microscope system 1102. Alternatively, in some embodiments, the thermal lensing member 1134 is eliminated such that the transient thermal lens is formed directly within the sample 1114 itself.

In some embodiments, a controller 1146 can optionally be provided, for example, to control operation of components of the microscope system 1102 and/or thermal-lens-forming optical assembly 1122. For example, the controller 1146 can coordinate detection by detector 1112 to correspond with the time when the thermal lens is formed and effective (e.g., on the order of microseconds or milliseconds after pulse absorption, depending on the applicable operation window). Alternatively or additionally, controller 1146 can control operation of components of assembly 1122 (e.g., focus activation light source 1128 or beam-shaping optical assembly 1124) to alter thermal lens formation, for example, to change focal spot location. For example, the controller 1146 can control the light source 1128 to alter emitted power in order to change focal depth within the sample 1114 and/or control the beam-shaping optical assembly 1124 to move location of the thermal lens within the thermal lensing member 1134 by shaping the beam. In some embodiments, the controller 1146 can communicate with a user via an input/output interface (e.g., GUI) to allow control of microscope, for example, to change location of imaging or probing within sample 1114.

In the context of the microscope setup 1120 of FIG. 11B, the modulation of the refractive index 1144 can be understood as a transient microlens with radius $\omega_0$ and focal length $F(\infty)$ sculpted within the focal region of the physical lens 1104. The resulting spot size 1138, $\omega(\infty)$, of such system 1120 is dictated by the Abbe diffraction limit of the transient microlens, which is smaller than the diffraction limit of the physical optical system and is given by:

$$\omega(\infty) \approx \frac{\lambda F(\infty)}{2\omega_0} \quad (14)$$

The final spot size $\omega(\infty)$ depends on the specific material and system parameters. For example, if a power 0.1 W is used, the expected improvement of the focal size can be about $\omega(\infty) \approx 0.4\omega_0$.

In order to go beyond the focusing limits of currently available high-index immersion objectives, the heat profile 1142 radius needs to be scaled down to $\omega_0 < 1$ µm, which can pose two technical challenges. First, light absorption would need to occur within the Rayleigh range of the focused vortex (<2 µm). Hence, a combination of wavelength of the focus-activation light 1130 and material of the thermal lensing member 1134 that results in high light absorption may be used. Second, when such a small spatial scale is considered, the stability of the heat profile can become difficult to maintain because of heat diffusion. However, pulsed laser sources of high intensity, and potentially samples with low heat conductivity, can counter these issues by operating in the regime of negligible heat diffusion (e.g., thermal confinement). In some embodiments, it is also possible to use shorter wavelengths for the focus-activation light 1130 and longer wavelengths for the probe beam 1110, which may allow more efficient heat generation using, for example, plasmonic nanostructures. However, such shorter wavelengths may be more susceptible to scattering. Moreover, the efficiency and availability of materials that can operate using higher wavelengths as probes for photochemical effects or fluorescence microscopy may be limited.

Fabricated Examples and Experimental Results

A setup similar to that illustrated in FIG. 11B was fabricated and used to investigate optical properties of the system. When the probe beam 1110 passes through the sculpted microlens (either collimated or focused), it will converge to a tighter focal point 1138 than what is allowed by the optical system 1102. For example, FIG. 12A shows the diffraction limited focal spot size obtained by the optical system 1102 alone, and FIG. 12B shows the focal spot size obtained by the modified optical system employing the transient thermal lens. The smaller focal point of FIG. 12B can be used as a scanning probe for imaging at superior resolution without any labeling process or material insertion, providing high flexibility of the optical configuration.

The setup was further used to image a USAF resolution chart placed behind the thermal lensing member (e.g., an absorbing chamber). The chart was placed at a plane where the thermally-induced focal point was obtained. A two-dimensional motorized scanning stage was used for lateral scanning, and a SCMOS camera was placed behind the object to collect the transmitted light. The intensity of the final image for each pixel was determined by the integration over a selected area of the camera. The image obtained without use of the transient thermal lens (FIG. 13A and curve 1302 in FIG. 13C) resulted in a lower spatial resolution than the one obtained by utilizing the tighter focal point achieved through the thermal effect (FIG. 13B and curve 1304 in FIG. 13C).

FIG. 14 illustrates a fabricated experimental setup 1400 employing the transient thermal lens. A monochromatic beam 1404 of wavelength 1064 nm from laser 1402 was expanded by a set of lenses (lens 1410 having a focal length of 50 mm, and lens 1412 having a focal length of 150 mm). A beam shutter 1406 was disposed along the beam path from laser 1402 and was controlled by a function generator 1438 to determine the duration of an exposure. The beam 1404 was directed via mirrors 1408, 1414 through a vortex phase plate 1440 to produce shaped beam 1442, which was subsequently directed via dichroic 1416 to spherical lens 1420, having focal length of 200 mm, and focused by lens 1420 to produce a ring-shaped light pattern. At the same time, a probe beam 1428 of wavelength 780 nm from laser 1426 was directed via mirrors 1430 along the optical beam path to thermal lensing member 1422. For convenience, the probe beam 1428 was directed through the same limiting aperture 1418 as a plane wave; however, it is also possible to focus it to the exact location of the ring-shaped focus-activation beam. The probe beam 1428 was introduced using dichroic mirror 1416, and lenses 1432 (having focal length of 100 mm) and spherical lens 1420 as a telescope.

The thermal lensing member 1422 was designed to strongly absorb at 1064 nm but negligibly absorb at 780 nm. The thermal lensing member 1422 was produced by mixing 1% of NIR absorbing dye in water and placing it in a thin glass chamber. The heat profile generated by the absorption of the shaped light beam 1442 resulted in a tight focus just after the absorbing material in a plane indicated by dashed line 1424. The transient focusing plane was imaged using a 4-f imaging system (not shown) and a camera 1436 triggered by the function generator 1438. A bandpass filter 1434 was used to block any residual light from laser 1402 not absorbed by the thermal lensing member 1422. For imaging applications, a sample of interest was placed just behind the thermal lensing member 1422 at the plane indicated by dashed line 1424, e.g., where the focal point is formed and scanned.

Figure 15A:
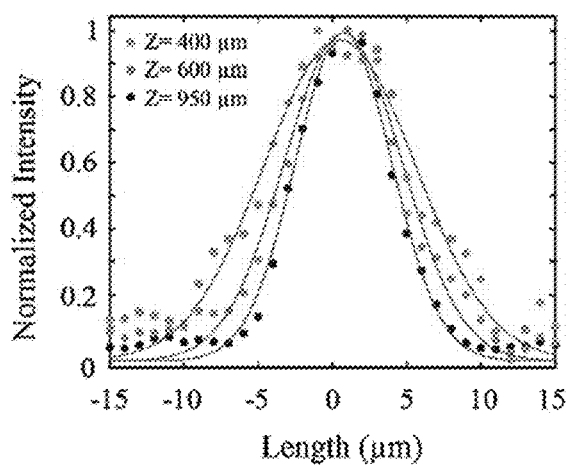
FIG. 15A is a graph of focal spot size for different axial distances from the thermal profile, obtained at an absorbed energy of 1 mJ, in the experimental setup of FIG. 14.
Figure 15B:
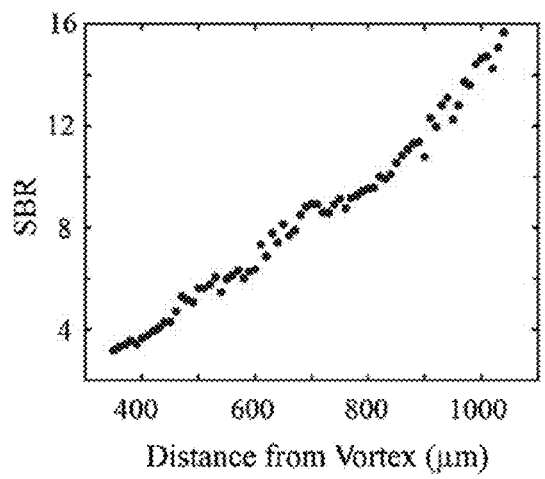
FIG. 15B is a graph of signal-to-background (SBR) values for different axial distances from the thermal profile, obtained for an absorbed energy of 1 mJ, in the experimental setup of FIG. 14.
Figure 15C:
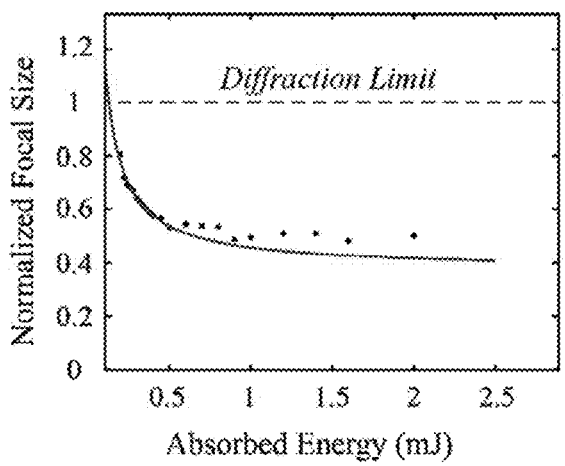
FIG. 15C is a graph of focal spot size normalized to system diffraction limit at increasing energy absorption values in the experimental setup of FIG. 14.

FIG. 15A shows the experimental focus spot size at three different distances from the vortex location after the thermal lensing member 1422 absorbed a total energy of 1 mJ. The confinement of the focal point is formed as the beam propagates away from the heated region. Accordingly, the signal to background (SBR) value increases as the tighter focal point is formed, as shown in FIG. 15B. FIG. 15C shows the focal spot size as a function of increasing energy absorption of the focus-activation beam 1442 (and thus heating). In FIG. 15C, the spot size has been normalized to the diffraction limit of the optical system (dashed line). The experimental data initially follow the expected power law of $\sim t^{-1}$ as shown by the fit (red line), but slightly deviates from the expected value at $\omega(\infty)$. This deviation arises from assumptions made to enable the analytical solution of the heat equation and obtain the closed-form expression in the equations above, such as an infinite medium model and a parabolic heat profile.

Figure 16A:
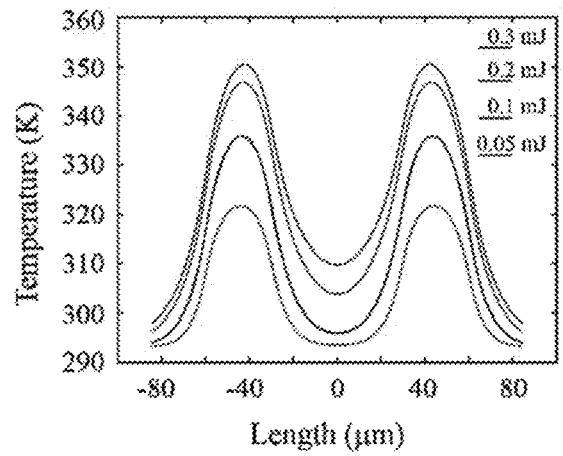
FIG. 16A is a graph of simulated heat profiles in cross-section generated by absorption of ring-shaped light patterns at different energy absorption values.
Figure 16B:
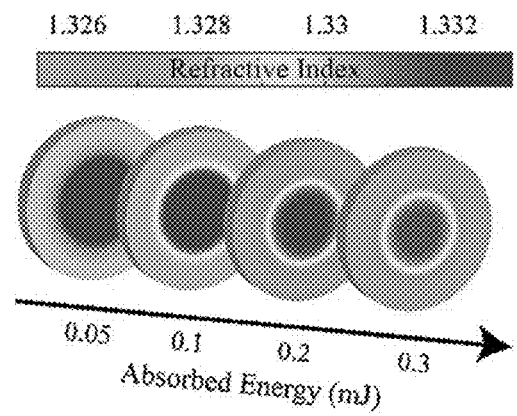
FIG. 16B illustrates refractive index maps or profiles corresponding to the simulated heat profiles of FIG. 16A.

To estimate the heat profile and the corresponding refractive index map in the experimental setup of FIG. 14, a heat diffusion simulation of the process was performed using COMSOL Multiphysics software. The exterior boundaries of the structure were kept at room temperature (T=293.15 K). Material properties, such as thermal conductivity and density, were taken from the built-in parameters of the software, under the assumption that the thermal lensing member had properties similar to water. The ring profile thickness was set to 30 μm since the absorptivity of the material is ~30 L/g·cm. Thus, after 30 μm the intensity drops to $e^{-1}$ of the initial intensity. The total power absorbed by the ring structure was set to 0.075 W, in agreement with the value of 0.1 W used in the experiments and considering the relative absorption in the 30 μm scale. From the heat distribution, the refractive index map can be calculated using pre-measured values of water refractive index at different temperatures. The heat profile across the heated region and the refractive index map are shown in FIGS. 16A-16B, respectively. The threshold damage temperature of 86° C. for a biological sample is reached after absorption of more than 0.3 mJ; however, as such levels, a nearly optimal focus can still be achieved.

Conclusion

Although some of the embodiments described above refer to "imaging," the production of an actual image is not strictly necessary. Indeed, the mentions of "imaging" are intended to include the acquisition of data where an image may not be produced. Accordingly, the use of the term "imaging" herein should not be understood as limiting.

Although particular optical components and configuration have been illustrated in the figures and discussed in detail herein, embodiments of the disclosed subject matter are not limited thereto. Indeed, one of ordinary skill in the art will readily appreciate that different optical components or configurations can be selected and/or optical components added to provide the same effect. In practical implementations, embodiments may include additional optical components or other variations beyond those illustrated, for example, additional reflecting elements to manipulate the beam path to fit a particular microscope geometry. Accordingly, embodiments of the disclosed subject matter are not limited to the particular optical configurations specifically illustrated and described herein.

Any of the features illustrated or described with respect to FIGS. 1-16B can be combined with any other features illustrated or described with respect to FIGS. 1-16B to provide systems, methods, devices, and embodiments not otherwise illustrated or specifically described herein. All features described herein are independent of one another and, except where structurally impossible, can be used in combination with any other feature described herein.

In view of the many possible embodiments to which the principles of the disclosed technology may be applied, it should be recognized that the illustrated embodiments are only preferred examples and should not be taken as limiting the scope of the disclosed technology. Rather, the scope is defined by the following claims. We therefore claim all that comes within the scope and spirit of these claims.

The invention claimed is:

1. An optical system comprising:
   a first light source providing a focus-activation beam of light having at least a first wavelength;
   a beam-shaping optical assembly comprising one or more optical components disposed in or along an optical path to a sample, the beam-shaping optical assembly forming the focus-activation beam from the first light source to have a radially-varying light pattern;
   a thermo-optic material disposed in the optical path before a target portion of a sample, the thermo-optic material absorbing light at the first wavelength, a temperature of the thermo-optic material increasing in response to said absorption; and
   a transient, converging thermal lens formed in the thermo-optic material by a heating-induced refractive index profile generated by the absorption of the focus-activation beam with the radially-varying light pattern,
   wherein:
     a temperature dependence of refractive index of the thermo-optic material is negative, and the radially-varying light pattern is an inverted light pattern having a minimum or zero intensity within a central region and a maximum intensity within an outer region surrounding the central region; or
     a temperature dependence of refractive index of the thermo-optic material is positive, and the radially-varying light pattern has a maximum intensity within a central region and a minimum or zero intensity within an outer region surrounding the central region.

2. The optical system of claim 1, wherein the beam-shaping optical assembly comprises one or more diffractive optical elements, one or more refractive optical elements, or any combination thereof.

3. The optical system of claim 1, wherein the beam-shaping optical assembly comprises a vortex phase plate, a spatial light modulator (SLM), a digital micromirror device (DMD), or any combination thereof.

4. The optical system of claim 3, wherein the first light source provides the focus-activation beam as substantially monochromatic light having the first wavelength.

5. The optical system of claim 1, further comprising:
   a second light source providing a probe beam of light having a second wavelength different from the first wavelength,
   wherein the thermo-optic material absorbs light at the first wavelength different than light at the second wavelength.

6. The optical system of claim 1, wherein:
the thermo-optic material comprises a thermal lensing member disposed in the optical path before the sample,
the thermal lensing member comprises glass, polymer, ceramic, a container with liquid solution therein, or any combination thereof, and
the thermal lensing member has a material composition thereof tailored to absorb light at the first wavelength.

7. The optical system of claim 1, further comprising:
an objective lens disposed in the optical path before the sample,
wherein the optical system is configured as an optical microscope.

8. The optical system of claim 1, wherein the thermo-optic material comprises a second portion of the sample disposed before the target portion.

9. The optical system of claim 1, wherein the first light source comprises a pulsed laser that outputs a train of optical pulses as the focus-activation beam, and the converging thermal lens is formed in the thermo-optic material by the heating-induced refractive index profile generated by absorption of a single one of the optical pulses of the train.

10. The optical system of claim 9, wherein one or more of the optical pulses has a pulse length less than 500 ns so as to minimize heat diffusion during operation of the thermal lens.

11. A kit for improving resolution of an optical microscope, the optical microscope having an objective lens and a probe beam light source, the kit comprising:
a focus-activation light source constructed to provide a beam of light having at least a first wavelength that is different from a wavelength emitted by the probe beam light source;
a beam-shaping optical assembly comprising one or more optical components to be disposed in or along an optical path to a sample, the beam-shaping optical assembly being constructed to form the beam from the focus-activation light source to have a radially-varying light pattern; and
a thermal lensing member constructed to be disposed in the optical path before the sample, the thermal lensing member being constructed to absorb light at the first wavelength such that a temperature of the thermal lensing member increases in response to said absorption so as to form a transient, converging thermal lens, the thermal lensing member absorbing light at the first wavelength different than light at the wavelength emitted by the probe beam light source,
wherein:
a temperature dependence of refractive index of the thermal lensing member is negative, and the radially-varying light pattern is an inverted light pattern having a minimum or zero intensity within a central region and a maximum intensity within an outer region surrounding the central region; or
a temperature dependence of refractive index of the thermal lensing member is positive, and the radially-varying light pattern has a maximum intensity within a central region and a minimum or zero intensity within an outer region surrounding the central region.

12. The kit of claim 11, wherein the thermal lensing member comprises glass, polymer, ceramic, a container with liquid solution therein, or any combination thereof, and the thermal lensing member has a material composition thereof tailored to absorb light at the first wavelength.

13. The kit of claim 11, wherein the thermal lensing member is substantially transparent to light at the wavelength emitted by the probe beam light source.

14. The kit of claim 11, wherein the beam-shaping optical assembly comprises one or more diffractive optical elements, one or more refractive optical elements, a vortex phase plate, a spatial light modulator (SLM), a digital micromirror device (DMD), or any combination thereof.

15. The kit of claim 11, wherein:
the focus-activation light source comprises a laser that outputs a train of optical pulses as the beam, and
the focus-activation light source and the thermal lensing member are configured such that a converging thermal lens is formed in the thermal lensing member by a heating-induced refractive index profile generated by absorption of a single one of the optical pulses of the train.

16. The kit of claim 15, wherein one or more of the optical pulses has a pulse length less than 500 ns so as to minimize heat diffusion during operation of the thermal lens.

17. A method comprising:
(a) forming a transient, converging thermal lens by:
generating a first beam of light having at least a first wavelength;
shaping the first beam to have a radially-varying light pattern; and
directing the shaped first beam to a thermo-optic material, the thermo-optic material absorbing light at the first wavelength, a temperature of the thermo-optic material increasing in response to said absorption,
wherein the thermal lens is formed in the thermo-optic material by a heating-induced refractive index profile generated by the absorption of the shaped first beam with the radially-varying light pattern, and
wherein:
a temperature dependence of refractive index of the thermo-optic material is negative, and the radially-varying light pattern is an inverted light pattern having a minimum or zero intensity within a central region and a maximum intensity within an outer region surrounding the central region; or
a temperature dependence of refractive index of the thermo-optic material is positive, and the radially-varying light pattern has a maximum intensity within a central region and a minimum or zero intensity within an outer region surrounding the central region.

18. The method of claim 17, further comprising:
(b) within 10 µs after (a), imaging a sample using at least the converging thermal lens by:
generating a second beam of light having a second wavelength different from the first wavelength;
using at least the converging thermal lens, focusing the second beam onto a target portion of the sample; and
detecting light from the target portion of the sample,
wherein the thermo-optic material absorbs light at the first wavelength different than light at the second wavelength,
the first beam comprises a train of optical pulses, and
the converging thermal lens is formed in the thermo-optic material by the heating-induced refractive index profile generated by absorption of a single one of the optical pulses of the train.

19. The method of claim 17, further comprising:
(b) within 1-10 ms after (a), imaging a sample using at least the converging thermal lens by:
generating a second beam of light having a second wavelength different from the first wavelength;
using at least the converging thermal lens, focusing the second beam onto a target portion of the sample; and
detecting light from the target portion of the sample,
wherein the thermo-optic material absorbs light at the first wavelength different than light at the second wavelength, and
the heating-induced refractive index profile of the converging thermal lens during (b) evolves from heat diffusion within the thermo-optic material.

20. The method of claim 17, wherein the shaping of (a) comprises using one or more diffractive optical elements, one or more refractive optical elements, a vortex phase plate, a spatial light modulator (SLM), a digital micromirror device (DMD), or any combination thereof to shape the first beam to have a light pattern with intensity that varies radially.

21. The method of claim 17, wherein:
the thermo-optic material comprises a thermal lensing member that is disposed in an optical path before a sample, the thermal lensing member having a material composition tailored to absorb light at the first wavelength, or
the thermo-optic material comprises a portion of a sample before a target portion of the sample.

* * * * *